(12) United States Patent
Hoffman et al.

(10) Patent No.: US 6,868,793 B2
(45) Date of Patent: Mar. 22, 2005

(54) DIRECT DRIVE FOR A WHEEL SET

(75) Inventors: Thilo Hoffman, Graz (AT); Andreas Jöckel, Nürenberg (DE); Martin Teichmann, Graz (AT)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/381,468
(22) PCT Filed: Sep. 26, 2001
(86) PCT No.: PCT/DE01/03685
§ 371 (c)(1),
(2), (4) Date: Mar. 25, 2003
(87) PCT Pub. No.: WO02/26541
PCT Pub. Date: Apr. 4, 2002

(65) Prior Publication Data
US 2004/0011578 A1 Jan. 22, 2004

(30) Foreign Application Priority Data
Sep. 27, 2000 (DE) .......................... 100 47 911

(51) Int. Cl.⁷ ................................................. B61C 9/00
(52) U.S. Cl. ..................................................... 105/136
(58) Field of Search .......................... 105/136, 96, 96.1, 105/97, 98, 113, 108, 131, 132, 133, 137, 138, 140; 180/65.1, 65.5, 65.6; 310/52, 54

(56) References Cited

U.S. PATENT DOCUMENTS 1,783,269 A    2/1930  Apple
4,745,314 A  * 5/1988  Nakano ........................ 310/57

FOREIGN PATENT DOCUMENTS

| EP | 0 413 337 A1 | 2/1991 |
| FR | 2 257 477 A | 8/1975 |
| FR | 2 281 850 A | 3/1976 |
| JP | 05 016800 A | 1/1993 |
| WO | WO 00/40446 * | 7/2000 |

* cited by examiner

Primary Examiner—Mark T. Le
(74) Attorney, Agent, or Firm—Henry M. Feiereisen

(57) ABSTRACT

A drive for a wheel set (1) of a chassis includes two wheels (3) positioned on a wheel set shaft (2), which can be driven by at least one internal rotor motor that encompasses the wheel set shaft (2) and has a stator (10) and a rotor (19). This configuration provides a compact direct drive.

14 Claims, 2 Drawing Sheets

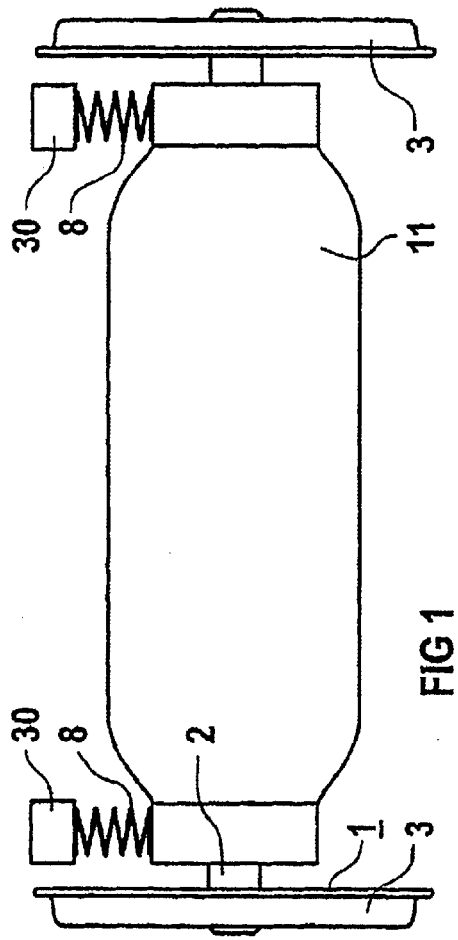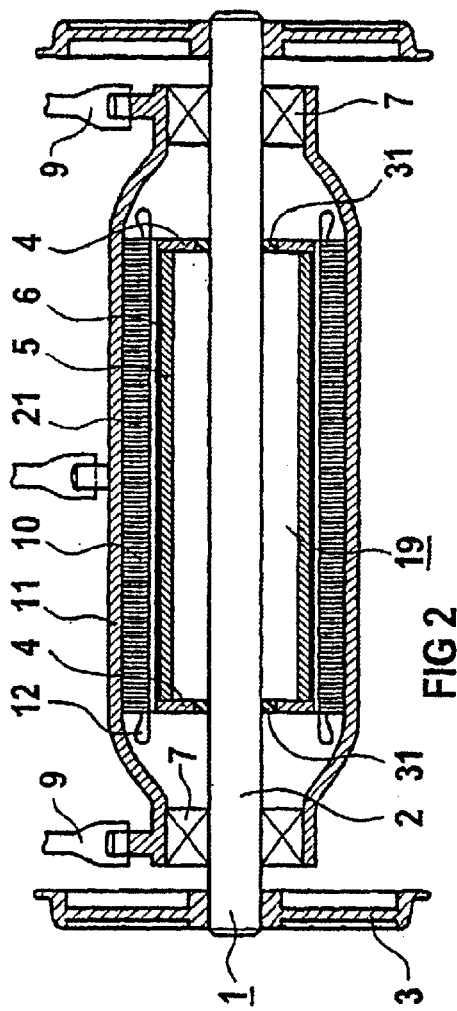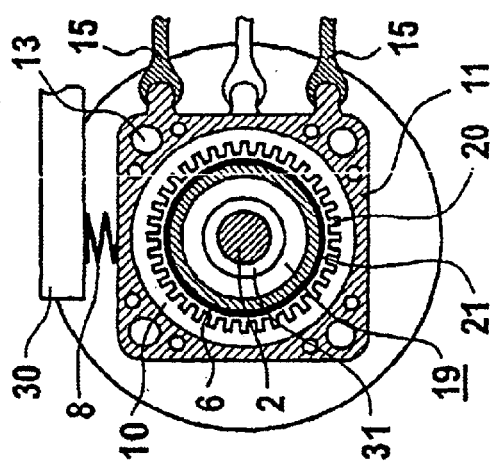

DIRECT DRIVE FOR A WHEEL SET

BACKGROUND OF THE INVENTION

The invention relates to a drive for a wheel set of a chassis.

EP 0 413 337 A1 discloses an electromotive direct drive for a railway vehicle, having an electronically commutated electric motor placed axially next to the wheel being driven and including a rotor, connected to the wheel being driven, for torque transmission. The rotor and the wheel being driven have rotation axes which are substantially in alignment. Moreover, the rotor is constructed as external rotor of the electric motor in the absence of a housing of the electric motor and is provided with permanent magnets distributed in ring-shaped fashion. Furthermore, the stator of the electric motor is restrained on the vehicle against execution of a rotation on a vehicle side which is distal to the wheel being driven.

As consequence of its disposition and construction, there is the drawback that this drive is hardly applicable for use in railway vehicles with conventional wheel sets that are supported externally or interiorly. The drive has to be shifted to the inside between both wheels of the wheel set being driven, whereby the disk-like configuration of this direct drive can be fitted in the available space between both wheel only with great constructive difficulty. Thus, this drive is not suitable for propelling a wheel set with continuous shaft.

SUMMARY OF THE INVENTION

The invention is thus based on the object to provide a drive for a wheel set of a chassis, which requires less maintenance works and is more cost-efficient to manufacture compared to conventional drive systems. Moreover, this drive concept should have decreased energy consumption and generate less noise emission. A further object of the invention is the construction of this drive system so as to be useable also in low-platform rail vehicles.

The posed object is attained by providing a drive for a wheel set of a chassis, including two wheels which are disposed on a shaft and can be driven by at least one internal rotor motor which encompasses the shaft and has a stator and a rotor.

The term "chassis" is to be understood to include, i.a., bogies and single axles.

Thus, the need for a transmission as well as for an elastic clutch between motor and wheel set is eliminated. A further advantage of this drive concept according to the invention is the reduced installation volume and the reduced weight of the overall drive arrangement compared to conventional drives.

According to a further configuration, the shaft of the wheel set is constructed as rotor at least along portions thereof. As a result, the shaft assumes electromagnetic as well as constructive functions. On one hand, the shaft acts as rotor of the internal rotor motor and establishes moreover as shaft the mechanical connection of both wheels of the wheel set. As a consequence, the production costs of the drive are further decreased. Advantageously, the shaft is hereby configured as hollow steel shaft, resulting in a further reduction in weight of the overall drive arrangement.

According to a particularly preferred embodiment, permanent magnets are disposed on the shaft for electromagnetic interaction with the stator of the internal rotor motor to thereby propel the wheel set. In particular advantageous is a direct bonding of the permanent magnets upon the hollow steel shaft. Losses in the rotor are very low so that the yoke of the rotor does not necessarily be configured as a laminated core structure.

According to a further embodiment, the drive is configured as permanent-excited synchronous motor. In order to equip the synchronous motor with an increased torque density, the provision of a high pole number, in particular greater than or equal to 16 poles, is advantageous. This pole number, established as a consequence of the slight yoke height in view of the outer diameter of the given installation space, leads to a fairly great air gap diameter. For this reason, this drive as a result of this synchronous motor is also appropriate for the increasingly smaller wheel diameter that result in more comfort in view of the lower floor height in the boarding zone and door area of railway vehicles.

The high pole number results also in very short winding end portions, thereby increasing the effectiveness of the synchronous motor and permitting a prolongation of the stack of laminations at set installation length of the drive. As a consequence, the synchronous machine can be best suited to the existing, in particular tubular installation volume, in particular when small wheels are involved.

As the losses of the synchronous machine are encountered substantially in the component at rest, i.e. in the stator in the present case, these losses should be dissipated through this region of the synchronous machine. The use of conventional self-ventilation and fan-cooled types is hereby conceivable. According to a further configuration of this invention, the stator has a liquid cooling, in particular to prevent noise emission of the fan. Especially, when the stator has a casing of polygonal cross section, cooling ducts, required for the liquid cooling, are arranged in the corners. Axial cooling ducts are essentially provided there in parallel relationship to the shaft of the wheel set. In particular, when the housing of the stator has a tetragonal cross section, the outer diameter of the stack of laminations is not decreased by the arrangement of these axial cooling ducts. As a result of the near complete encapsulation of the synchronous machine by a housing with liquid cooling, in particular water cooling, and the low rotation speed as well as the resultant elimination of an air cooler, very low noise emissions are achieved. As the rotation speed and the shaft diameter of wheel set and drive are identical, the bearing of internal rotor motor and wheel set can be combined, in particular when the wheel set is supported by an internal bearing. As a result, the number of required bearings is decreased to two rolling-contact bearings, just like in a non-driven wheel set. The production costs of the drive are thereby reduced as is the need for maintenance works. In particular, the need for re-lubrication is eliminated. In current bearing technologies, the wheel set bearings have now longer service life than the wheel disks so that the provision of an external support of the wheel sets, as considered appropriate in the past, becomes moot.

As the synchronous motor is supported upon the shaft of the wheel set, there is no longer any need for a complicated driving motor suspension in the chassis. Rather, there is only a need for a torque support between drive and the vehicle. The hereby accompanying increase of unsprung masses as a result of this drive according to the invention is secondary as far as the stress upon the superstructure or the running dynamics are concerned. In particular, the increase of the unsprung masses in a speed range of up to 160 km/h is completely negligible.

Especially in the even higher speed range, it is advantageous to decouple the masses of the drive, at least partially, from the wheel set through suitable means, e.g. elastomers.

Hereby, rubber elements are, for example, arranged between rotor and shaft.

It is also possible to provide such a coupling between rotor and shaft, for example, in the area of the air gap.

Advantageously, this torque support includes at least a central push-pull rod arranged between the wheels of a wheel set. In this way, i.a. the tensile forces of the drive are transmitted directly to the vehicle. This results in a reduction of the pitching moments of the chassis. Moreover, a wheel set relief is avoided, when a tensile force is applied, because the chassis is no longer exposed to any reaction moments and forces of the drive. Moreover, there is no transmission of dynamic reaction moments into the chassis, thereby reducing the transmission of structure-borne noise.

Central arrangement of a push-pull rod as a simple torque support is especially advantageous when the guidance of the wheel set in longitudinal direction is hard because the tensile force is anyway transmitted there via outer control arms.

When a soft longitudinal guidance of the wheel set is involved, the provision of a double push-pull rod is advantageous.

Furthermore, the drive and brake moments or the drive and brake forces are no longer decisive when constructing the components, rather it is only necessary to dimension with respect to the forces of the driving dynamics.

This drive, applicable preferably for railway vehicles with wheel sets, introduces an economical drive concept for a direct drive for railway vehicles and is appropriate also for small wheels with diameters of about 620 mm. The basic advantages such as smaller energy consumption, less maintenance works, reduced production costs, smaller noise emissions, and prevention of oil losses of the transmission play an essential role hereby.

As wheel set and internal rotor motor are internally supported, the chassis can be provided much easier with a sound protection device.

BRIEF DESCRIPTION OF THE DRAWING

The invention as well as further advantageous configurations of the invention according to the features of the subclaims will now be described in more detail with reference to schematically illustrated exemplified embodiments in the drawing, in which:

FIG. 1 shows a side view of a principle illustration of a drive for a wheel set, FIG. 2 shows a longitudinal section of this wheel set, FIG. 3 shows a cross section of this drive for the wheel set.

DETAILED DESCRIPTION OF PREFERRED EMBODIMENTS

Figure 4:
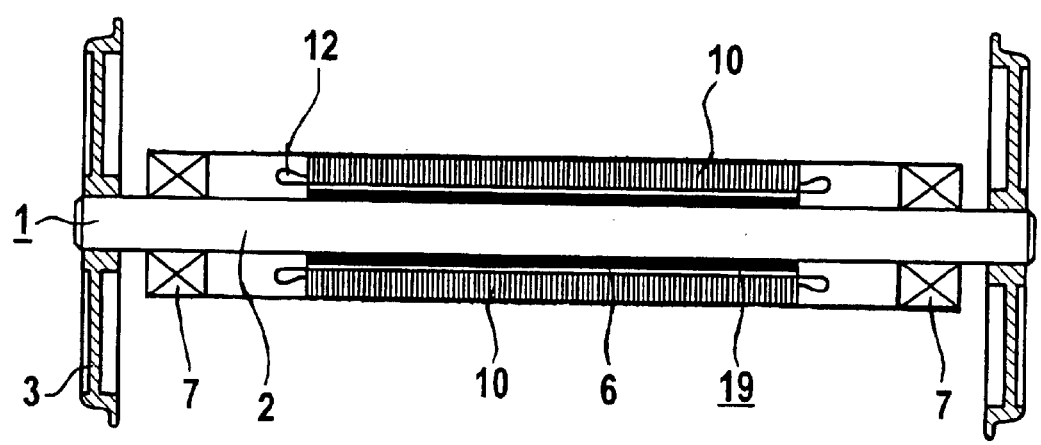
FIG. 4 shows a longitudinal section of another embodiment of a drive for a wheel set.

A wheel set 1 of a chassis, not shown in more detail in FIG. 1, includes a wheel set shaft 2 and the wheels 3 mounted to this wheel set shaft 2. The wheels 3 are secured to the wheel set shaft 2, in particular shrunk-on. A rotor 19 of an electric motor configured as internal rotor motor, in particular as synchronous motor, is disposed according to FIG. 2 upon the wheel set shaft 2. The rotor 19 has essentially a tubular configuration and is situated on the wheel set shaft 2 between two steel plates 4. The tubular rotor 19 is hereby made preferably as hollow steel shaft 5 supporting permanent magnets 6 about the surface. Advantageously, the hollow steel shaft 5 is coupled via rubber elements 31 with the wheel set shaft 2. Stator 10 and the rotor 19, which is situated upon the wheel set shaft 2, are mechanically connected via rolling-contact bearings 7. These rolling-contact bearings 7 assume the function wheel set bearing as well as the function driving motor bearing so that only two rolling-contact bearings 7 are to be provided per wheel set 1. Supported in vertical direction by the housing 11 of the stator 10 and the bearing of the rolling-contact bearings via a primary spring assembly 8 are the longitudinal chassis beams, not shown in more detail. The drive of the wheel set 1 is guided via elastic control arms 9 in longitudinal direction and for movements about its vertical axis by the longitudinal chassis beams. The stator 10 of the drive, configured as synchronous machine, includes a stack of laminations, a housing 11 as well as windings disposed in slots 20 of the stator 10 to form winding end portions 12 on the respective end faces of the stack of laminations. As a consequence of an electromagnetic interaction of the stator 10 with its rotor 19 and the rigid connection thereof with the wheel set shaft 2, the wheel set shaft 2 rotates and thus the wheels 3 disposed on the respective ends of the wheel set shaft 2.

FIG. 3 is a cross section of a direct drive, designed in accordance with the invention, for a wheel set 1, to depict the primary spring assembly 8 upon the longitudinal chassis beams 30, the substantially square housing 11 of the stator 10 for lateral attachment of a double tension rod 15 which receives the torque and thereby reduces at the same time the longitudinal connection in a central area so as to directly transmit the torque into the vehicle body. The housing 11 of the stator 10 has cooling ducts 13 which are circulated in particular by a liquid to thereby assist in an efficient cooling of the stator 10.

Turning now to FIG. 4, there is shown another embodiment of a drive for a wheel set 1 including wheel set shaft 2 and wheels 3. Parts corresponding with those in FIG. 1 are denoted by identical reference numerals and not explained again. The description below will center on the differences between the embodiments. In this embodiment, the rotor 19 is formed by a portion of the wheel set shaft 2, with the permanent magnets 6 being directly bonded or glued onto the wheel set shaft 2 to thereby propel the wheel set 1. The wheel set shaft 2 can be configured hereby as a hollow steel shaft.

The stack of laminations of the stator 10 exhibits the generally typical slot-tooth geometry. In particular, the stack of laminations may be provided with axial cooling ducts for circulation of, preferably, air. The rotor 19 of such a direct drive according to the invention is positioned directly upon or about the wheel set shaft 2, with permanent magnets 6 disposed on the side of the rotor 19, which side confronts the air gap 21. The permanent magnets 6 may be disposed as circular segment like structure upon the rotor 19 and in particular the hollow steel shaft 5, with the circular segments having a curvature substantially corresponding to the curvature of the rotor 19. The rotor 19 is thus constructed to resemble a rotation-symmetric round rotor. Of course, other arrangements of permanent magnets 6 are possible as well, such as, e.g., secant-shape or V-shape. Also, the use of suitable measures, e.g. a bandage, enables a fixation of the permanent magnets 6 to the rotor, especially at high rotation speeds of the railway drives.

The direct drive of a wheel set 1 in accordance with the invention enables a conceivably simple drive. Compared to conventional drives, there is neither a need for geared couplings nor for unnecessary rolling-contact bearings 7 because only two greased integrated rolling-contact bearings are required for operation. As a result, maintenance work is significantly reduced. The wheel set direct drive according to the invention results in less energy costs and has a higher driving efficiency. The suitability for small wheel diameters, as repeatedly set forth, makes this direct drive also advantageous for low-platform chassis and vehicle bodies.

What is claimed is:

1. A drive of a wheel set constructed for support of a chassis and having a wheel set shaft and two wheels mounted to the wheel set shaft, said drive constructed as internal rotor motor for driving the wheel set shaft and comprising a stator; and a rotor formed by a portion of the wheel set shaft and including permanent magnets which are attached to the portion of the wheel set shaft and interact electromagnetically with the stator for propelling the wheel set.

2. The drive of claim 1, wherein the wheel set shaft is a hollow steel shaft.

3. The drive of claim 1, wherein the permanent magnets are glued onto the portion of the wheel set shaft.

4. The drive of claim 1, configured as permanent-excited synchronous motor.

5. The drive of claim 4, wherein the synchronous motor is of non-salient pole configuration.

6. The drive of claim 5, wherein the synchronous motor has a pole number which is greater than or equal to 16.

7. The drive of claim 1, and further comprising a liquid cooling system for cooling at least the stator.

8. The drive of claim 7, wherein the stator has a housing of polygonal cross section, thereby defining corners, said liquid cooling system including axial cooling duds formed in the corners of the housing for circulation of a liquid.

9. The drive of claim 1, and further comprising a two bearings only for support of the wheel set and of the internal rotor motor.

10. The drive of claim 1, and further comprising at least one central push-pull rod disposed between the wheels of the wheel set.

11. The drive of claim 1, and further comprising means for at least partially decoupling masses of the drive from the wheel set.

12. The drive of claim 1, for application in a railway vehicle with a plurality of said wheel set.

13. The drive of claim 12, wherein the railway vehicle includes a low-floor bogie.

14. The drive of claim 1, wherein the internal rotor motor has a dimension smaller than a dimension of a side of a wheel of the wheel set.

* * * * *

UNITED STATES PATENT AND TRADEMARK OFFICE
CERTIFICATE OF CORRECTION

PATENT NO. : 6,868,793 B2 Page 1 of 1
DATED : March 22, 2005
INVENTOR(S) : Hoffmann et al.

It is certified that error appears in the above-identified patent and that said Letters Patent is hereby corrected as shown below:

<u>Title page,</u>
Items [12] and [75], Inventors, replace name of inventor "Hoffman" with -- Hoffmann --

<u>Column 6,</u>
Line 7, replace "duds" with -- ducts --

Signed and Sealed this

Seventh Day of June, 2005

JON W. DUDAS
*Director of the United States Patent and Trademark Office*